April 10, 1934.    H. E. FROMM    1,954,200
TRANSMISSION
Filed Nov. 25, 1929    2 Sheets-Sheet 1

INVENTOR
HARRY E. FROMM.
BY
ATTORNEY

April 10, 1934.  H. E. FROMM  1,954,200

TRANSMISSION

Filed Nov. 25, 1929  2 Sheets-Sheet 2

INVENTOR
HARRY E. FROMM.
BY
*Irving Harness*
ATTORNEY

Patented Apr. 10, 1934

1,954,200

UNITED STATES PATENT OFFICE 1,954,200

TRANSMISSION

Harry E. Fromm, Detroit, Mich., assignor to Chrysler Corporation, Detroit, Mich., a corporation of Delaware Application November 25, 1929, Serial No. 409,556

6 Claims. (Cl. 188—77)

The main objects of this invention are to provide improved control mechanism for the reversing band of a planetary transmission, to provide improved means for applying the reversing band of such a transmission with a predetermined maximum force so as to prevent distortion of the band; to provide an improved adjusting means for tightening the reversing band which may be set within predetermined limits so as to obviate the necessity of delicate adjustments; to provide yieldable means in a control mechanism of this kind for allowing a substantial band tightening adjustment at one time so as to obviate the necessity of frequent slight adjustments; and to provide control mechanism which will automatically compensate for the slight wear, stretching and thermal expansion to which a reversing band is normally subjected.

Heretofore, in control mechanism for reversing bands of planetary transmissions, rigid members have been employed between the actuating member of the control mechanism and the portion of the band to which pressure was supplied. The rigidity of such structure necessitated very delicate adjustments for only a slight movement of reversing bands of this type is permissible. With the prior construction it was necessary to readjust the apparatus frequently so as to take up the lost motion resulting from wear, stretching and thermal expansion to which reversing bands of this type are normally subjected.

An illustrative embodiment of my invention is shown in the accompanying drawings, in which.

Figure 1:
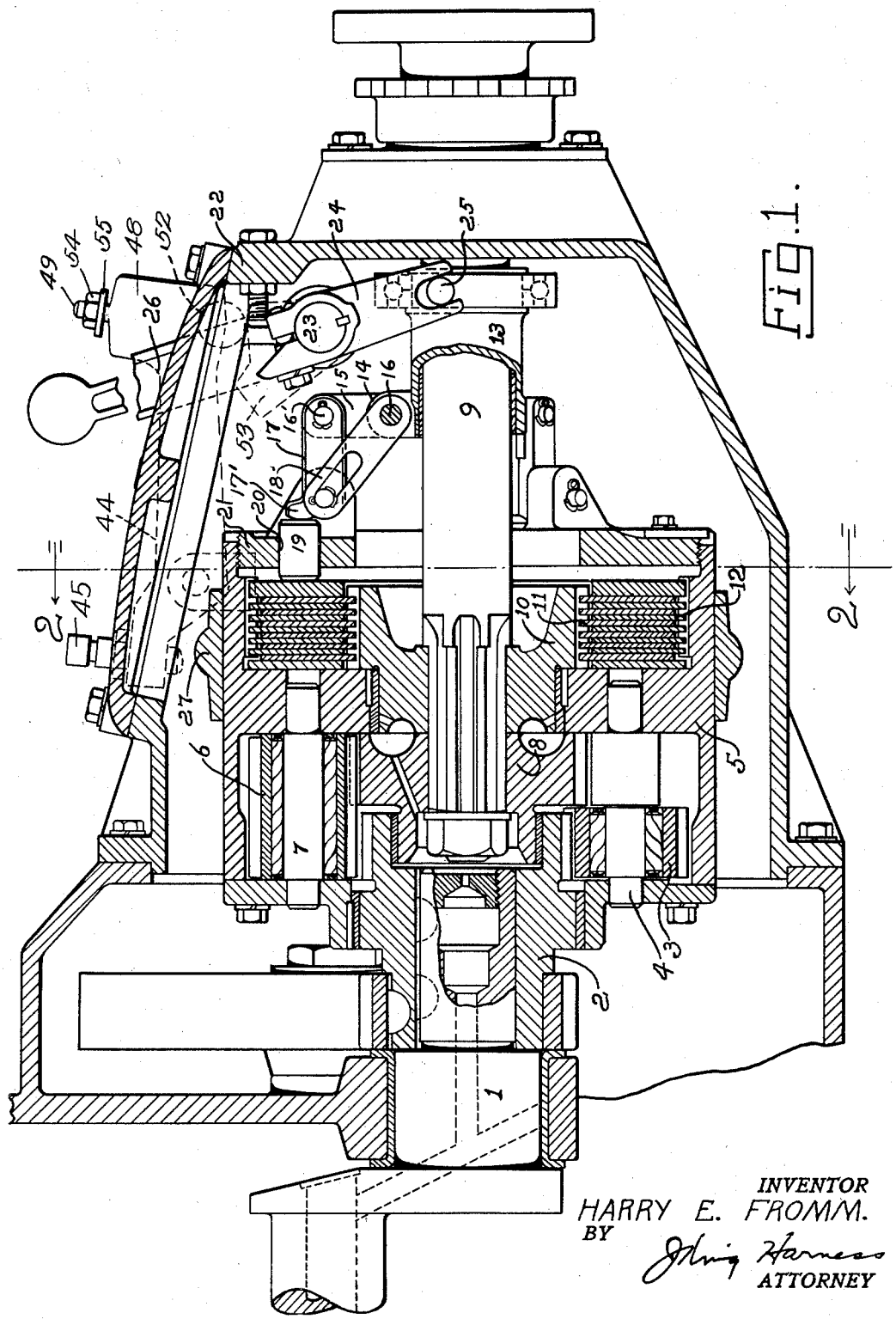
Fig. 1 is a longitudinal section of a planetary transmission embodying my invention.

In the form shown, the driving and driven elements, the rotatable drum and the reversing band of the planetary transmission are all of standard construction. The transmission includes a clutch and clutch operating apparatus for selectively engaging the driving and driven elements together. Coacting in timed relation with the clutch actuating apparatus is a reversing band control mechanism which is adapted to secure the rotatable drum against rotation when the clutch is released, and to release the rotatable drum when the clutch engages the driving and driven elements together.

In the illustration shown, the transmission comprises a driving shaft 1 on which a pinion 2 is keyed. The pinion 2 meshes with a series of spaced gears 3 which are rotatably mounted on shafts 4 carried by the rotatable drum 5. The rotatable drum 5 is also provided with a series of spaced gears 6 which are rotatably mounted on shafts 7. The gears 6 are wider than the gears 3 and they mesh with a pinion 8 which is keyed to the driven shaft 9. Rigidly secured to the driven shaft 9 is a clutch element 10 comprising spaced disks 11. These spaced disks are alternately arranged with respect to a series of disks 12 which are rigid with the drum 5.

Clutch actuating mechanism is provided for engaging the disks of the rotatable drum and clutch member together when it is desired to drive forwardly through the drum 5. This mechanism includes a sleeve 13 which is slidably mounted on the driven shaft 10. Secured to the sleeve 13 is a radially extending flange 14 on which a link 15 is pivoted at 16. Pivotally mounted at 16' on the free end of the link 15 is a cam lever 17. The free end portion of the lever 17 is slidably and pivotally connected with a diagonal link 18 which is also pivoted at 16 on the flange 14. The left extremity of the lever 17 carries a lug 17' having a cam face which bears against a pin 19 that is slidably mounted in an aperture 20 formed in the right end of the drum 5. The mechanism includes three pins 19, as shown in Fig. 2, each of which are operated by a cam lever 17 in the above manner so as to urge the plates 11 and 12 together when the sleeve 13 is in the position shown in Fig. 1.

Journaled in the transmission housing 22 is a shaft 23 to which is secured an arm 24 having a forked extremity for receiving a lug 25 on the sleeve 13. When the sleeve is in the position shown in Fig. 1, the diagonal link 18 urges the free end of the lever 17 downwardly and the cam face of the lugs 17' holds the pin 19 at its innermost position. When the shaft 23 is rotated in a clockwise direction by the lever 26 to which it is keyed, the sleeve is moved to the left as viewed in Fig. 1. During leftward movement of the sleeve from the position shown in Fig. 1, the members 15, 18 and 17 are turned to the right substantially as a unit and the lug 17 is moved out of contact with the pin 19. It is understood that any desired number of cam levers 17 may be provided on the sleeve 13 in registration with corresponding pins 19.

A reversing band 27 is concentrically mounted on the drum 5 and secured at its closed side to the housing 22 by an anchor bolt 28 which is shiftably mounted in a plug 29. On the external end of the anchor bolt 28 are a pair of lock nuts 30 by which the closed side of the band 27 may be adustably positioned, the anchor bolt being yieldably held in a desired position by a spring 31 which bears between a collar 32 on the bolt and the inner end of the plug 29.

Figure 2:
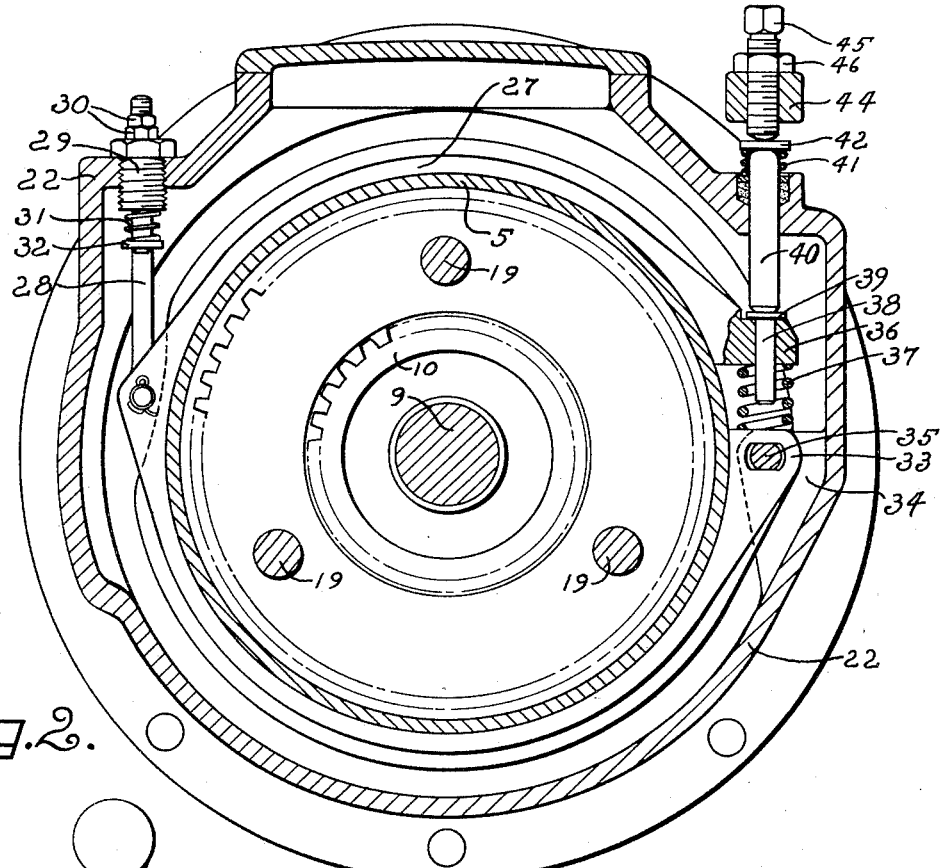
Fig. 2 is a vertical section taken on line 2—2 of Fig. 1.

The right side of the band 27, as viewed in Fig. 2, is split and one end 33 of the band is secured to a flange 34 of the housing by a pin 35. The other end 36 of the band 27 is normally urged away from the fixed end 33 by a coil spring 37 which is located between the adjacent extremities of the band and which normally retains the band in a released condition. Extending through an aperture in the end 36 of the band is a centering pin 38 having a head 39 on which a pressure pin 40 rests. The pin 40 is slidably mounted in an aperture in the transmission housing 5 and is surrounded by a spring 41 which bears between the housing and a head 42 on the external end of the pin 40.

Figure 3:
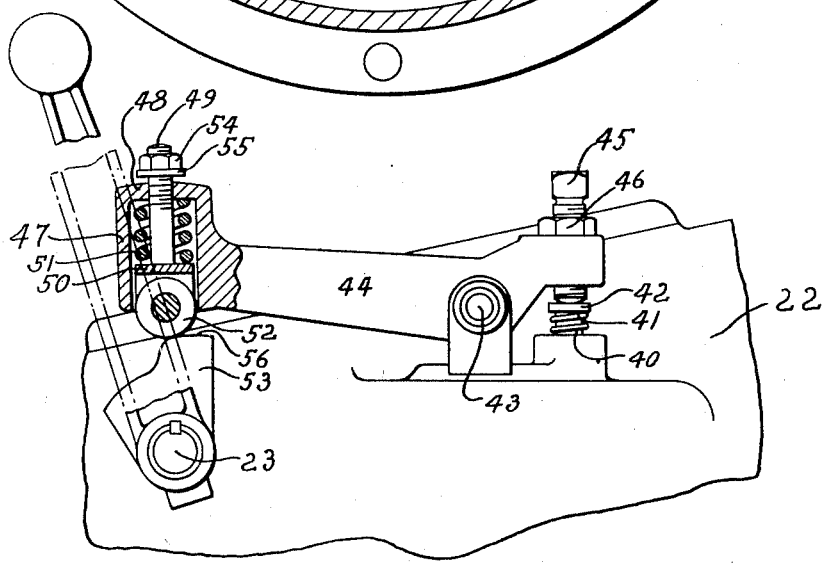
Fig. 3 is a fragmentary side elevation showing the control mechanism partly in section.

Pivotally mounted at 43 on the exterior of the casing 5 is a rocker arm 44 having one end located substantially above the head 42 of the pin 40. An adjustable bolt 45 having a lock nut 46 is threaded in the right hand end of the rocker arm 44 as viewed in Fig. 3, and engages the head 42 of the pressure pin 40. The bolt 45 may be set in any desired position by the lock nut 46.

On the opposite end of the rocker arm 44 is a tubular member 47 having a closed upper end 48 and an open bottom extremity. A shiftable member comprising a bolt 49 and a yoke 50 is slidably mounted in the open end of the tubular member 47 and is normally urged outwardly by a spring 51 which bears between the yoke 50 and the closed end 48 of the tubular member. Journaled on the yoke 50 is a cam roll 52 that engages the periphery of a cam 53 which is keyed on the crank 23. The bolt 49 extends through an aperture in the closed end 48 of the tubular member and is secured against displacement by a nut 54 having an integral washer 55 which is adapted to set upon the top of the tubular member when the spring 51 is extended.

In operation, when the lever 26 and shaft 23 are rotated in a clockwise direction as viewed in Fig. 1, so as to release the clutch disks 12 of the rotatable drum 5 from the clutch disks 11 of the clutch member 10, the crest 56 of the cam 53 urges the roller 52 upwardly thereby compressing the spring 51 and rotating the right hand end of the rocker arm 44 downwardly. This action causes the adjustable bolt 45 to bear upon the pressure pin 40 which in turn applies the reversing band 27 to the periphery of the drum 5 and secures the drum against rotation.

With the drum secured against rotation, the gears 3 and 7 rotate relative to the drum and drive the pinion 4 and driven shaft 9 in a reverse direction. The transmission may be set in a neutral state by placing the operating lever 34 midway between its right and left hand positions. This setting of the lever causes the clutch plates to be disengaged and the reversing band 27 to be released at the same time, thereby permitting free rotation of the drum 5 and simultaneously disconnecting it from the driven shaft 9.

The spring 51 predetermines the maximum force which is applied on the band and in this way safeguards the band from distortion. This spring also allows the rocker arm 44 to move relative to the actuating cam 53 during adjustment of the bolt 45 so as to permit a substantial adjustment of this bolt at one time. In this manner, the necessity of frequent and delicate adjustments is avoided and a clearance is provided between the top end of the tubular member 47 and the washer 55 which permits the rocker arm to rotate in a clockwise direction under the action of the spring 51 as the band 27 wears, stretches and expands.

Although but one specific embodiment of this invention has herein been shown and described, it will be understood that various changes including the size, shape and arrangement of parts, may be made without departing from the spirit of my invention and it is not my intention to limit its scope other than by the terms of the appended claims.

I claim:

1. In a planetary transmission comprising a housing and a rotatable drum, a reversing band substantially concentric with said drum, mechanism for applying said band to said drum comprising a rocker arm pivotally mounted on said housing, actuating means for rocking said arm, a shiftable member on said rocker arm coacting with said actuating means, and a spring bearing between said rocker arm and said shiftable member adapted to allow said actuating means to be moved relative to said arm throughout a predetermined range without varying the force supplied on said band.

2. In a planetary transmission comprising a housing and a rotatable drum, means for securing said drum against rotation, mechanism for applying said means comprising a rocker arm, actuating means for rocking said arm, an adjustable member on said rocker arm for predetermining the effective throw thereof, and a shiftable member bearing between said actuating means and said rocker arm for allowing said arm to move relative to said actuating mechanism during adjustment of said adjustable member so as to obviate the necessity of delicate adjustments thereof.

3. In a planetary transmission comprising a housing and a rotatable drum, a reversing band substantially concentric with said drum for securing the latter against rotation, resilient means normally urging said band to a released position, a push rod slidably mounted in said housing for applying said band to said drum, control mechanism for said band comprising a rocker arm pivotally mounted on said housing, an adjustable bolt at one end of said arm coacting with said push rod, actuating means on said housing for rocking said arm, a shiftable member on the other end of said arm coacting with said actuating means, and a spring bearing between said shiftable member and said arm, said spring being compressible under the action of said bolt during adjustment thereof for obviating the necessity of delicate adjustment.

4. The combination with a planetary transmission comprising driving and driven shafts and a rotatable drum, of a train of gears between said driving shaft and said drum, coacting clutch members on said drum and driven shafts respectively, clutch actuating mechanism for operating said clutch members, a reversing band substantially concentric with said drum for securing said drum against rotation, mechanism for applying said band to said drum in a predetermined timed relation to the operation of said clutch members comprising a cam and rocker arm, a shiftable member bearing between said cam and rocker arm, and a spring between said shiftable member and rocker arm for limiting the force applied on said band and compensating for slight wear, stretching and expansion of said band.

5. In a planetary transmission comprising a housing and a rotatable drum, means for securing said drum against rotation relative to said housing, mechanism for applying said means comprising a rocker arm, actuating means for rocking said arm, a member shiftably mounted on said rocker arm engaging said actuating means, and a spring between said shiftable member and rocker arm constituting the sole medium for transmitting an applying force from said actuating means to said rocker arm and drum securing means and adapted to predetermine the effective throw of said rocker arm and to compensate for slight wear in and stretching of said reversing means.

6. In a planetary transmission comprising a rotatable drum, a reversing band substantially concentric with said drum, and mechanism for applying said band to said drum including a chain of relatively movable parts, one of said parts having a resilient member disposed at one end thereof and an adjustable member disposed at the opposite end thereof, said resilient member constituting the sole medium for transmitting an applying force from one of said relatively movable parts to another and adapted to predetermine the maximum force applied on said band, and said adjustable member being so constructed and arranged as to place said resilient member under compression during reversing band adjustment for conditioning said resilient member to automatically take up for wear.

HARRY E. FROMM.